United States Patent

Cumberledge et al.

[11] Patent Number: 5,165,002
[45] Date of Patent: Nov. 17, 1992

[54] METHOD OF COUPLING AN ELECTRICAL SIGNAL TO AN OPTICAL FIBER

[75] Inventors: William S. Cumberledge, Scottsdale; Damon L. Morgan; David L. Vowles, both of Phoenix, all of Ariz.

[73] Assignee: Motorola, Inc., Schaumburg, Ill.

[21] Appl. No.: 799,575

[22] Filed: Nov. 27, 1991

[51] Int. Cl.⁵ .............. G02B 6/26; H01J 5/16; B29D 11/00; H01L 23/48
[52] U.S. Cl. .................... 385/92; 385/88; 385/94; 250/227.11; 264/1.5; 264/1.7; 264/1.1
[58] Field of Search .......... 385/88, 89, 91, 92, 385/94, 76; 250/227.11; 264/513, 1.5, 1.7, 2.5, 2.7, 1.1; 357/74, 80, 72

[56] References Cited

U.S. PATENT DOCUMENTS

| | | | |
|---|---|---|---|
| 4,173,389 | 11/1979 | Curtis | 385/92 |
| 4,427,879 | 1/1984 | Becher et al. | 385/92 X |
| 4,533,209 | 8/1985 | Segerson et al. | 385/88 |
| 4,539,476 | 9/1985 | Donuma et al. | 385/88 |
| 4,778,240 | 10/1988 | Komatsu | 385/92 |
| 4,915,470 | 4/1990 | Moore et al. | 385/88 X |
| 5,005,939 | 4/1991 | Arvanitakis et al. | 385/89 X |
| 5,032,898 | 7/1991 | Bowen et al. | 385/92 |
| 5,046,798 | 9/1991 | Yagiu et al. | 385/92 |
| 5,065,226 | 11/1991 | Kluitmans et al. | 385/92 |

FOREIGN PATENT DOCUMENTS 2545467 4/1977 Fed. Rep. of Germany ... 385/92 X

*Primary Examiner*—Brian Healy
*Attorney, Agent, or Firm*—Joe E. Barbee

[57] ABSTRACT

The present invention provides a method of coupling an electrical signal to an optical fiber (14). The method includes encapsulating an electrical connector (21), an optical semiconductor device (18,36), and a fiber optic cable (14) all in one body (23,38,41,42). The semiconductor device (18,36) is electrically coupled to the electrical connector (21), and is also aligned to the fiber optic cable (14). The components are encapsulated in one single body (23,38,41,42). The single body (23,38,41,42) permanently maintains the alignment. The electrical connector (21) portion of the body (23,38,41,42) provides an easy means to couple the fiber optical cable (14) to electrical signals.

17 Claims, 2 Drawing Sheets

METHOD OF COUPLING AN ELECTRICAL SIGNAL TO AN OPTICAL FIBER

BACKGROUND OF THE INVENTION

The present invention relates, in general, to optical semiconductor connectors, and more particularly, to a novel electro-optic assembly.

In the past, various methods have been utilized to interface a fiber optic cable to an optical semiconductor device. These previous interface methods typically employ a connector that is formed in two detachable sections. The two sections are generally joined by screw threads or push-in type snap tabs. The first section is firmly attached to one end of a fiber optic cable with the cable's extreme end portion protruding from the first section. The second section contains an optical semiconductor device along with channels, or grooves that guide the first section when the first section is mated to the second section. As the first section is mated to the second section, the guides align the fiber optic cable to the optical semiconductor device. Typically, the alignment provided by these connectors is not optimum which limits the amount of optical energy launched into the optical cable. These two piece connectors may be mated and separated many times during the connector's life. Since it is important to have the fiber optic cable properly aligned to the active area of the device each time the sections are mated, the channels or grooves must be formed with very precise tolerances. Consequently, these fiber optic connectors generally are very expensive.

When the two sections of the fiber optic connector are detached, the exposed end of the fiber optic cable and the optical semiconductor device can become damaged or contaminated by dirt, grease, or other materials. When the two sections are reconnected, the damage or the contaminants can degrade the performance of the fiber optic system.

Accordingly, it is desirable to have a method of converting a fiber optic signal to an electrical signal that does not require high precision alignment grooves or channels, that has a low cost, and that cannot be easily contaminated or damaged.

SUMMARY OF THE INVENTION

Briefly stated, the present invention provides a method of coupling an electrical signal to an optical fiber. The method includes encapsulating an electrical connector, an optical semiconductor device, and a portion of a fiber optic cable all in one body. The semiconductor device is electrically coupled to the electrical connector, and is also aligned to the fiber optic cable. The components are encapsulated in one single body. The single body permanently maintains the alignment. The electrical connector portion of the body provides an easy means to couple the fiber optical cable to electrical signals.

DETAILED DESCRIPTION OF THE DRAWINGS

Figure 1:
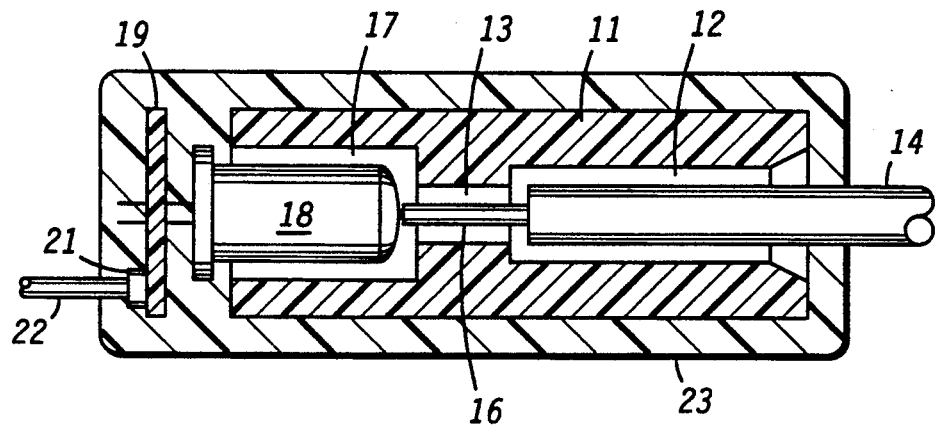
FIG. 1 is a cross-sectional view of an electro-optic assembly embodiment in accordance with the present invention.

FIG. 1 illustrates a cross-sectional view of an electro-optic assembly 10 that translates a fiber optic signal to an electrical signal and also includes a means for connecting the assembly to a mating electrical connector. A subhousing 11 has an optical cavity 12 and an electrical cavity 17 that assist in aligning a fiber optic cable 14 to a packaged optical semiconductor device 18. Subhousing 11 generally is a molded plastic material although other materials may be used. Optical cavity 12 is an opening that extends from one end of subhousing 11 into subhousing 11, and intersects electrical cavity 17. Near the intersection of cavity 12 and cavity 17, the diameter of optical cavity 12 narrows to form an alignment section 13. Typically, fiber optic cable 14 includes a core 16, which includes a thin cladding layer (not shown), that is surrounded by a protective sheath. The protective sheath is removed from the extreme end portion of fiber optic cable 14. The end portion is inserted into cavity 12 so that core 16 is positioned within alignment cavity 13.

Electrical connector 21 and device 18 are mounted on a small printed circuit board 19 in order to form an electrical connection between device 18 and electrical connector 21. In addition, circuit board 19 provides a rigid support for both device 18 and connector 21, and also protects the leads of device 18. A variety of other connection means that are well known to those skilled in the art, such as a ceramic circuit board, or metal conductors embedded in a plastic carrier, could be utilized in place of circuit board 19. Generally, the leads of device 18 are inserted through one side of circuit board 19, and connector 21 is attached to a second side. Conductors on circuit board 19 electrically couple each lead of device 18 to an electrical terminal 22 that is part of electrical connector 21. Only one terminal 22 is shown due to the cross section of printed circuit board 19; however, there is generally one terminal 22 for each lead of device 18. Device 18 can be either an optical detector or an optical emitter. In addition, amplifier circuits that amplify the signal from device 18, in the case of a detector, or the signal to device 18, in the case of an emitter, can also be mounted on circuit board 19. Typically, the amplifier circuits would be coupled to each lead of device 18 and to each terminal 22. Circuit board 19 is positioned so that device 18 is within electrical cavity 17. Then, core 16 is aligned to the optically active area of device 18 by an active alignment procedure that is well known to those skilled in the art. Optionally, an adhesive such as epoxy may be used to ensure the alignment is maintained during a subsequent encapsulation operation. The adhesive generally is placed around cable 14 and the opening of cavity 12, and also around circuit board 19 and the opening of cavity 17.

An assembly body 23 is formed around the components of assembly 10 by encapsulating subhousing 11, printed circuit board 19, a portion of fiber optic cable 14, and a portion of electrical terminal 22. The encapsulation step can employ a variety of procedures including, but not limited to, transfer molding, injection molding, or plastic casting. The encapsulation maintains permanent alignment between fiber optic cable 14 and device 18. Therefore, electrical terminal 22 can be quickly disconnected from a mating electrical connector without contaminating or damaging fiber optic cable 14, or disturbing the alignment. This is a significant advantage over prior connectors that separated an optical cable from an optical device.

Figure 2:
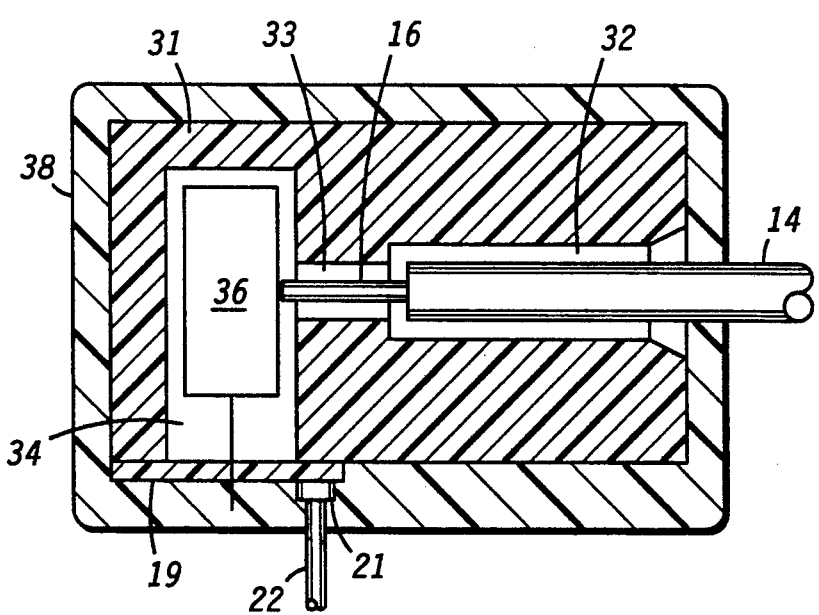
FIG. 2 is a cross-sectional view of another embodiment of an electro-optic assembly in accordance with the present invention.

FIG. 2 illustrates a cross-sectional view of an alternate embodiment of an electro-optic assembly 30. The elements of FIG. 2 that are the same as FIG. 1 have the same reference numerals. A subhousing 31 includes and optical cavity 32 and an alignment cavity 33 that perform a function similar to cavities 12 and 13 of FIG. 1. Fiber optic cable 14, along with core 16, is inserted into optical cavity 32 so that a portion of core 16 is positioned within alignment cavity 33. A packaged optical semiconductor device 36 is inserted into an electrical cavity 34. Subhousing 31 has a different configuration than subhousing 11 of FIG. 1 since the package of device 36 is different from the package of device 18 used in FIG. 1. Device 36 is mounted on printed circuit board 19 along with connector 21 in a manner similar to device 18 of FIG. 1. Fiber optic cable 14 is aligned to an active area of device 36 by an active alignment procedure that is well known to those skilled in the art. An assembly body 38 is used to encapsulate subhousing 31, a portion of fiber optic cable 14, printed circuit board 19, and a portion of electrical connector 21 in a manner similar to the encapsulation of assembly 10 from FIG. 1.

Figure 3:
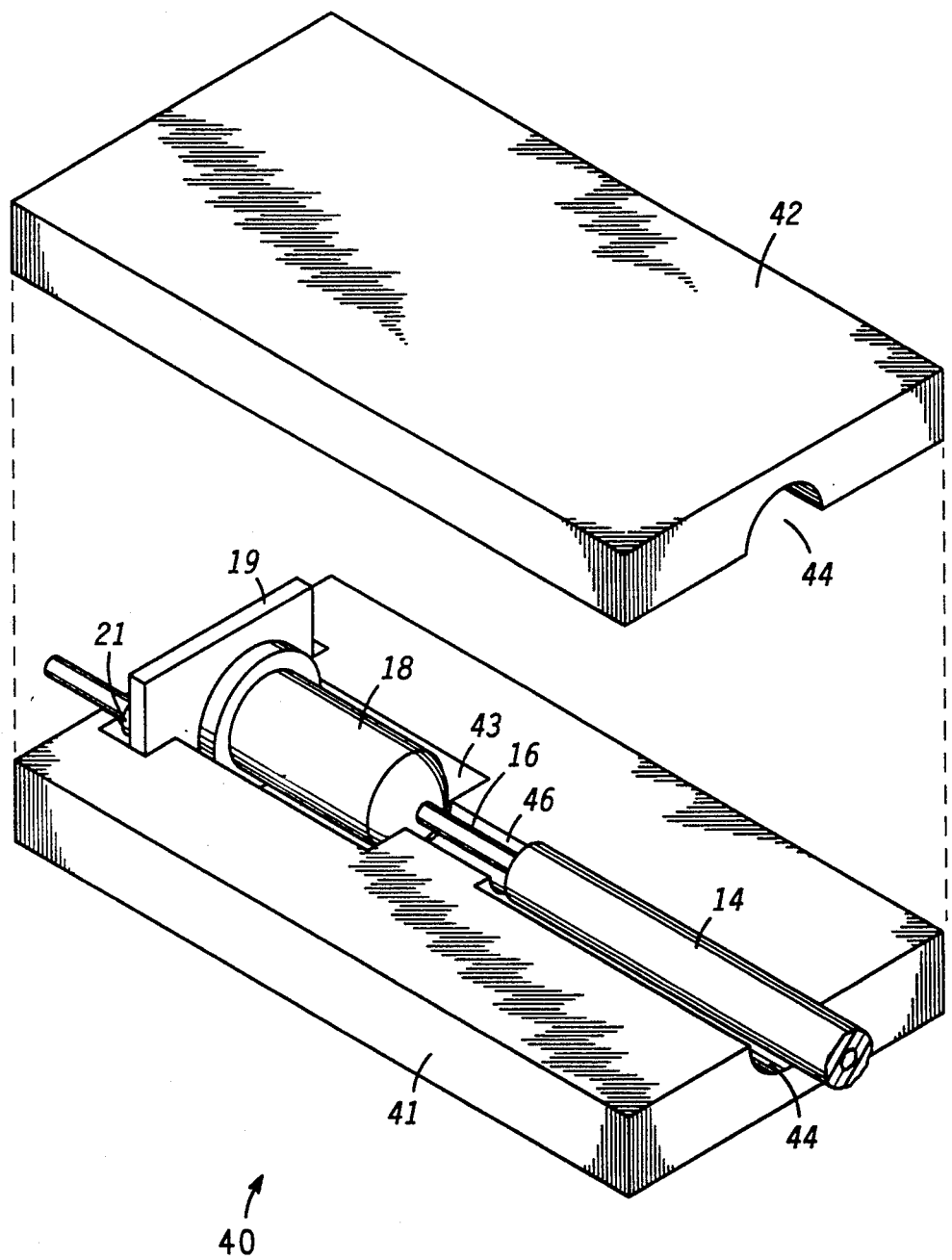
FIG. 3 is a cutaway perspective view of another embodiment of an electro-optic assembly in accordance with the present invention.

FIG. 3 illustrates an alternate embodiment of an electro-optic assembly 40. The elements of FIG. 3 that are same as FIG. 1 have the same reference numerals. Assembly 40 has a body that is formed in two sections which include a bottom 41 and a cap or cover 42. Bottom 41 and cover 42 typically are two approximately equal halves, although other proportions can be used. Although bottom 41 and cover 42 generally are formed from a molded plastic material, other electrically insulating materials can be used. Bottom 41 includes a bottom portion of both an optical cavity 44 and an alignment cavity 46, in addition to a bottom portion of an electrical cavity 43. A top section of cavities 43, 44, and 46 are contained in cover 42. For simplicity of the drawings, the top section of cavities 43 and 46 are not shown. Cavities 43, 44, and 46 perform a function similar to cavities 17, 12, and 13 respectively of FIG. 1. The assembly that includes printed circuit board 19, device 18, and connector 21 is inserted into the bottom portion of electrical cavity 43 so that the optically active area of device 18 is aligned with core 16. The alignment operation employs an active alignment procedure that is well known to those skilled in the art. Cover 42 is then attached to bottom 41 in order to maintain the alignment and seal assembly 40. Generally, cover 42 is attached to bottom 41 by methods such as ultrasonic welding, or solvent welding that are well known to those skilled in the art.

By now it should be appreciated that there has been provided a novel way to form an electro-optic assembly. Encasing a fiber optic cable, an optical semiconductor device, and an electrical connector in one assembly provides an easy and simple means to connect the optical cable to electrical signals. The optical fiber is permanently aligned to the optical device. Therefore, optimum coupling is permanently provided between the optical fiber and the optical semiconductor device. Mating to other connectors is made via a matching electrical connector. Therefore, expensive high precision optical connectors are not required. Since the assembly is mated and unmated to the matching electrical connector without exposing the optical cable or the optical device to contaminants or damage, the reliability of the optical to electrical interface is maintained.

We claim:

1. A method of coupling an electrical signal to an optical fiber comprising:

providing a subhouse having an optical cavity that is a first opening extending from a first end of the subhousing a predetermined distance into the subhousing wherein the optical cavity has a first diameter, the subhousing also having an electrical cavity that is a second opening which extends into the subhousing and intersects the optical cavity;

positioning a fiber optic cable within the optical cavity;

positioning a packaged optical semiconductor device within the electrical cavity wherein the packaged optical semiconductor device has leads and an optically active area of the optical semiconductor device is substantially aligned to the optical fiber;

coupling the leads to terminals of an electrical connector wherein the terminals project from the connector; and molding a body around the subhousing, around the connector, around the first opening, and around the second opening wherein the fiber optical cable and the terminals of the connector extend from the body.

2. The method of claim 1 wherein the providing a subhousing step includes providing a subhousing having an electrical cavity with a second diameter that is larger than the first diameter.

3. The method of claim 1 wherein coupling the leads to the terminals of the electrical connector includes positioning the packaged optical semiconductor device on a first surface of a printed circuit board and the electrical connector on a second surface of the printed circuit board wherein conductors on the printed circuit board couple the leads to the terminals.

4. The method of claim 3 further including positioning amplifier circuits on the printed circuit board wherein the amplifier circuits are coupled to the leads.

5. The method of claim 1 wherein positioning a packaged optical semiconductor device includes positioning a packaged optical semiconductor device that is one of a packaged optical emitter device or a packaged optical detector device.

6. A method of coupling an electrical signal to an optical fiber comprising:

providing a packaged optical semiconductor device that is coupled to an electrical connector having a terminal;

positioning the packaged optical semiconductor device in a first opening of a subhousing;

positioning a fiber optic cable in a second opening of the subhousing wherein the fiber optic cable is substantially aligned to an optically active area of the packaged optical semiconductor device; and encapsulating the subhousing, a portion of the fiber optic cable, and a portion of the electrical connector wherein a portion of the electrical terminal projects from the assembly and a portion of the fiber optic cable projects from the assembly.

7. The method of claim 6 wherein the providing the packaged optical semiconductor device step includes mounting the packaged optical semiconductor device and the connector on a printed circuit board.

8. The method of claim 6 further including adhesively attaching the fiber optic cable to the subhousing prior to the encapsulating step.

9. The method of claim 8 wherein adhesively attaching the fiber optic cable to the subhousing includes placing an epoxy adhesive around the second opening so that the epoxy adheres to the subhousing and to the fiber optic cable.

10. The method of claim 6 wherein positioning the packaged optical semiconductor device in the first opening of the subhousing includes positioning the packaged optical semiconductor device in the first opening of a plastic subhousing.

11. The method of claim 6 wherein encapsulating includes using one of transfer molding, injection molding, or plastic casting.

12. The method of claim 6 wherein positioning the packaged optical semiconductor device includes positioning one of a packaged optical detector device or a packaged optical emitter device.

13. A method of coupling an electrical signal to an optical fiber comprising:
   providing a packaged optical semiconductor device having a lead of the device electrically coupled to a terminal of an electrical connector;
   aligning a fiber optic cable to an active area of the packaged optical semiconductor device; and
   encapsulating the packaged optical semiconductor device, a portion of the fiber optic cable, and a portion of the connector terminal thereby forming an assembly body.

14. The method of claim 13 wherein aligning the fiber optic cable to the active area of the packaged optical semiconductor device includes inserting the fiber optic cable into an opening in a subhousing wherein the opening is aligned to the active area.

15. A method of coupling an electrical signal to an optical fiber comprising:
   providing a packaged optical semiconductor device having a lead of the device electrically coupled to a terminal of an electrical connector;
   aligning a fiber optic cable to an active area of the packaged optical semiconductor device; and
   encapsulating the packaged optical semiconductor device, a portion of the fiber optic cable, and a portion of the connector terminal by using a body having a top portion and a bottom portion wherein the bottom portion has an opening that is aligned to the active area and the top portion is a cover for the body, and sealing the top portion to the bottom portion.

16. The method of claim 15 wherein sealing the top portion to the bottom portion includes using one of ultrasonic welding or solvent welding.

17. The method of claim 13 wherein encapsulating includes one of transfer molding or injection molding.

* * * * *

UNITED STATES PATENT AND TRADEMARK OFFICE
CERTIFICATE OF CORRECTION

PATENT NO. : 5,165,002
DATED : November 17, 1992
INVENTOR(S) : Cumberledge et al.

It is certified that error appears in the above-indentified patent and that said Letters Patent is hereby corrected as shown below:

Column 4, claim 1, line 8, delete "subhouse" and insert therefor --subhousing--.

Column 4, line 28, claim 1, delete "optical" and insert therefor --optic--.

Signed and Sealed this

Seventh Day of February, 1995

Attest:

BRUCE LEHMAN

Attesting Officer    Commissioner of Patents and Trademarks

REEXAMINATION CERTIFICATE (4772nd)

United States Patent
Cumberledge et al.

(10) Number: US 5,165,002 C1
(45) Certificate Issued: Apr. 22, 2003

(54) METHOD OF COUPLING AN ELECTRICAL SIGNAL TO AN OPTICAL FIBER

(75) Inventors: William S. Cumberledge, Scottsdale, AZ (US); Damon L. Morgan, Phoenix, AZ (US); David L. Vowles, Phoenix, AZ (US)

(73) Assignee: Motorola, Inc., Schaumburg, IL (US)

Reexamination Request:
No. 90/005,755, Jun. 16, 2000

Reexamination Certificate for:
Patent No.: 5,165,002
Issued: Nov. 17, 1992
Appl. No.: 07/799,575
Filed: Nov. 27, 1991

Certificate of Correction issued Feb. 7, 1995.

(51) Int. Cl.[7] ............ G02B 6/26; H01L 5/16; H01L 23/48; B29D 11/00
(52) U.S. Cl. ............ 385/92; 88/94; 250/227.11; 264/1.5; 264/1.1; 264/1.7
(58) Field of Search ............ 385/88, 89, 91, 385/92, 94, 76; 250/227.1; 264/313, 1.5, 1.7, 2.5, 2.7, 1.1; 257/98, 99, 100

(56) References Cited

U.S. PATENT DOCUMENTS

| | | | | |
|---|---|---|---|---|
| 4,186,996 A | 2/1980 | Bowen et al. | | 385/76 X |
| 4,410,469 A | 10/1983 | Katagiri et al. | | 264/1.5 |
| 5,005,939 A | 4/1991 | Arvanitakis et al. | | 385/14 X |
| 5,123,066 A | 6/1992 | Acarlar | | 385/14 X |
| 5,165,002 A | 11/1992 | Cumberledge | | 385/14 X |

FOREIGN PATENT DOCUMENTS

| | | | | |
|---|---|---|---|---|
| JP | 61080207 | 4/1986 | | 385/14 X |
| JP | 61105517 | 5/1986 | | 385/14 X |
| JP | 61105518 | 5/1986 | | 385/14 X |

*Primary Examiner*—Brian Healy

(57) ABSTRACT

The present invention provides a method of coupling an electrical signal to an optical fiber (14). The method includes encapsulating an electrical connector (21), an optical semiconductor device (18,36), and a fiber optic cable (14) all in one body (23,38,41,42). The semiconductor device (18,36) is electrically coupled to the electrical connector (21), and is also aligned to the fiber optic cable (14). The components are encapsulated in one single body (23,38,41,42). The single body (23,38,41,42) permanently maintains the alignment. The electrical connector (21) portion of the body (23,38,41, 42) provides an easy means to couple the fiber optical cable (14) to electrical signals.

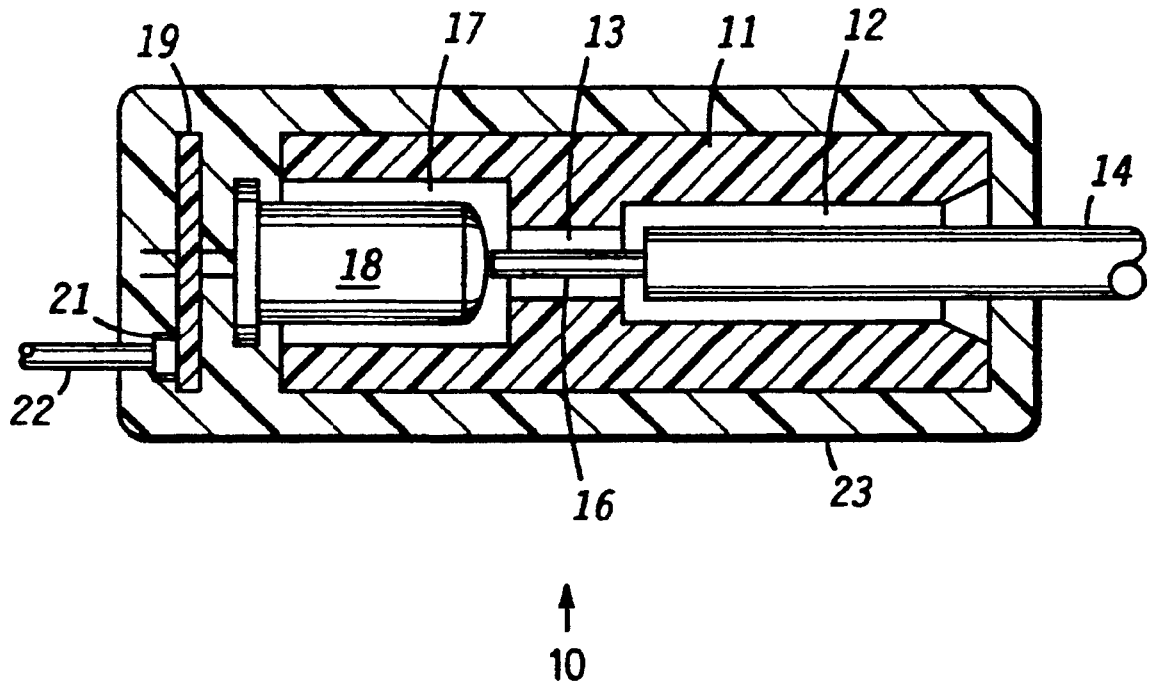

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 8 and 14–16 are cancelled.

Claims 1, 4, 6, 7 and 9–13 are determined to be patentable as amended.

Claims 2, 5 and 17, dependent on an amended claim, are determined to be patentable.

1. A method of coupling an electrical signal to an optical fiber comprising:
   providing a *one-piece* subhousing having an optical cavity that is a first opening extending from a first end of the subhousing a predetermined distance into the subhousing wherein the optical cavity has a first diameter, the subhousing also having an electrical cavity that is a second opening which extends into the subhousing and intersects the optical cavity;
   positioning a fiber optic cable within the optical cavity;
   positioning a packaged optical semiconductor device within the electrical cavity wherein the packaged optical semiconductor device has leads and an optically active area of the optical semiconductor device is substantially aligned to the optical fiber;
   [coupling the leads to terminals of an electrical connector wherein the terminals project from the connector; and]
   *coupling the leads of the packaged optical semiconductor device to conductors on a first surface of a printed circuit board;*
   *positioning an electrical connector on a second surface of the printed circuit board and coupling terminals of the electrical connector to the conductors of the printed circuit board; and*
   molding a body around the subhousing, around the connector, around the first opening, *around the printed circuit board,* and around the second opening wherein the fiber optic cable and the terminals of the connector extend from the body.

4. The method of claim [3] *1* further including positioning amplifier circuits on the printed circuit board wherein the amplifier circuits are coupled to the leads.

6. A method of coupling an electrical signal to an optical fiber comprising:
   providing a packaged optical semiconductor device that is coupled to an electrical connector having a terminal;
   positioning the packaged optical semiconductor device in a first opening of a subhousing;
   positioning a fiber optic cable in a second opening of the subhousing wherein the fiber optic cable is substantially aligned to an optically active area of the packaged optical semiconductor device; [and]
   *adhesively attaching the fiber optic cable to the subhousing and adhesively attaching the packaged optical semiconductor device to the subhousing; and*
   encapsulating the subhousing, a portion of the fiber optic cable, and a portion of the electrical connector *to form an assembly,* wherein a portion of the electrical terminal projects from the assembly and a portion of the fiber optic cable projects from the assembly, *and wherein a material used to encapsulate the subhousing does not enter the second opening where the fiber optic cable is aligned to the optically active area.*

7. The method of claim 6 wherein the providing the packaged optical semiconductor device step includes mounting the packaged optical semiconductor device and the connector on a printed circuit board, *and the printed circuit board is encapsulated as a part of the assembly.*

9. The method of claim [8] *7* wherein adhesively attaching the fiber optic cable to the subhousing includes placing an epoxy adhesive around the second opening so that the epoxy adheres to the subhousing and to the fiber optic cable.

10. The method of claim [6] *9* wherein positioning the packaged optical semiconductor device in the first opening of the subhousing includes positioning the packaged optical semiconductor device in the first opening of a *one-piece* plastic subhousing.

11. The method of claim [6] *10* wherein encapsulating includes using one of transfer molding, injection molding, or plastic casting.

12. The method of claim [6] *11* wherein positioning the packaged optical semiconductor device includes positioning one of a packaged optical detector device or a packaged optical emitter device.

13. A method of coupling an electrical signal to an optical fiber comprising:
   *providing a subhousing having an optical cavity that is a first opening extending from a first side of the subhousing a first predetermined distance into the subhousing, the subhousing also having an electrical cavity that is a second opening extending from a second side of the subhousing a second predetermined distance into the subhousing and intersects the optical cavity;*
   providing a packaged optical semiconductor device having a lead [of the device electrically coupled to a terminal of an electrical connector], *the packaged optical semiconductor device inserted into the electrical cavity*;
   *inserting a fiber optic cable into the optical cavity and thereby* aligning [a] *the* fiber optic cable to an active area of the packaged optical semiconductor device; [and]
   *electrically connecting the lead of the packaged optical semiconductor device to a printed circuit board, the printed circuit board being positioned at the second side of the subhousing, and electrically connecting an electrical connector to the printed circuit board;*
   encapsulating the [packaged optical semiconductor device] *subhousing,* a portion of the fiber optic cable, *the printed circuit board,* and a portion of the *electrical* connector [terminal] thereby forming an assembly body.

* * * * *